United States Patent
Ely et al.

[11] Patent Number: 6,115,737
[45] Date of Patent: *Sep. 5, 2000

[54] SYSTEM AND METHOD FOR ACCESSING CUSTOMER CONTACT SERVICES OVER A NETWORK

[75] Inventors: Thomas C. Ely, Bridgewater; Michael A. Martin, Hillsborough; Thomas S. Novak, Glen Gardner; Darek A. Smyk, Piscataway, all of N.J.

[73] Assignee: Telcordia Technologies, Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,253

[22] Filed: Jul. 24, 1996

[51] Int. Cl.$^7$ ...................................................... G06F 15/16
[52] U.S. Cl. .......................... 709/203; 709/217; 709/218; 709/219; 709/227; 709/229; 709/245; 713/201; 713/202
[58] Field of Search .................... 395/200.01, 200.02, 395/200.03, 200.06, 200.09, 200.12, 187.01, 200.46–200.49, 200.57–200.6, 200.3–200.33; 399/67, 88, 45, 38, 46, 51, 89, 207; 348/3, 24, 49; 709/200, 202–203, 217–219, 227–230, 245; 713/201–202; 707/1, 9–10

[56] References Cited

U.S. PATENT DOCUMENTS

| 5,329,619 | 7/1994 | Page et al. | 709/203 |
|---|---|---|---|
| 5,553,239 | 9/1996 | Heath et al. | 713/201 |
| 5,572,581 | 11/1996 | Sattar et al. | 379/201 |
| 5,572,643 | 11/1996 | Judson | 709/218 |
| 5,590,197 | 12/1996 | Chen et al. | 705/65 |
| 5,673,322 | 9/1997 | Pepe et al. | 705/52 |
| 5,678,041 | 10/1997 | Baker et al. | 709/229 |
| 5,724,355 | 3/1998 | Bruno et al. | 709/231 |
| 5,751,961 | 5/1998 | Smyk | 709/217 |
| 5,815,665 | 9/1998 | Teper | 709/229 |

*Primary Examiner*—Zarni Maung
*Assistant Examiner*—Bharat Barot
*Attorney, Agent, or Firm*—Joseph Giordano

[57] ABSTRACT

A customer contact services node/Internet gateway (CCSN/IG) connects a user to the services and to information from a provider via the Internet. The user can thereby get information about the services and can initiate service changes and can get user-specific information.

14 Claims, 8 Drawing Sheets

FIG. 4A

WELCOME: TO VIEW INFORMATION ABOUT ANY OF THE SERVICE FEATURES ON THIS PAGE, PLEASE CLICK ON THE CORRESPONDING FEATURE BUTTON

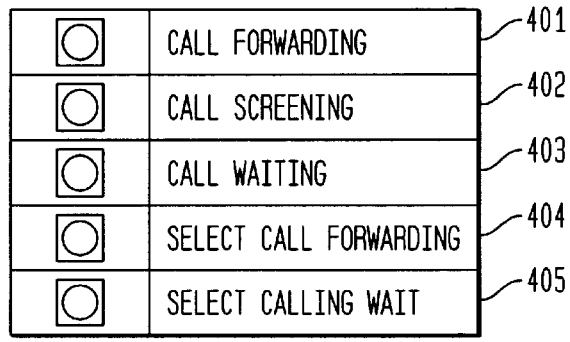

- 401 CALL FORWARDING
- 402 CALL SCREENING
- 403 CALL WAITING
- 404 SELECT CALL FORWARDING
- 405 SELECT CALLING WAIT

IF YOU WOULD LIKE TO ORDER OR CANCEL ANY OF THE ABOVE SERVICE FEATURES, PLEASE PRESS THE ORDER/CANCEL BUTTON

ORDER/CANCEL ~406

FIG. 4B

VERIFICATION

IN ORDER TO CHANGE YOUR SERVICE, YOU NEED TO ENTER YOUR TELEPHONE NUMBER, AND PASSWORD. WHEN FINISHED CLICK THE SUBMIT BUTTON

TELEPHONE NUMBER [ ] ~407

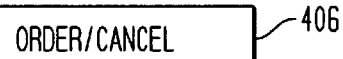

○ THE LAST 4 DIGITS OF YOUR CALLING CARD NUMBER [ ] ~408
○ THE LAST 3 DIGITS OF YOUR ACCOUNT NUMBER [ ] ~409
○ YOUR 4 DIGIT PAY BY PHONE PIN [ ] ~410

SUBMIT ~411

*FIG. 4C*

SERVICE MODIFICATION REQUEST

ACCOUNT (510)811-6150, J.DOE —412

... —420    —413

| | | CURRENTLY SUBSCRIBED FEATURES | INDICATE DESIRED MODIFICATIONS | | |
|---|---|---|---|---|---|
| | | | ORDER | CANCEL | NOCHANGE |
| SERVICE FEATURES | CALL FORWARDING | NO | 0 | | 0 |
| | CALL SCREENING | NO | 0 | | 0 |
| | CALL WAITING | YES | | 0 | 0 |
| | SELECT CALL FORWARDING | NO | 0 | | 0 |
| | SPEED CALLING WAIT | YES | | 0 | 0 |

... —420    SUBMIT —414

CANCEL —415    ... —420

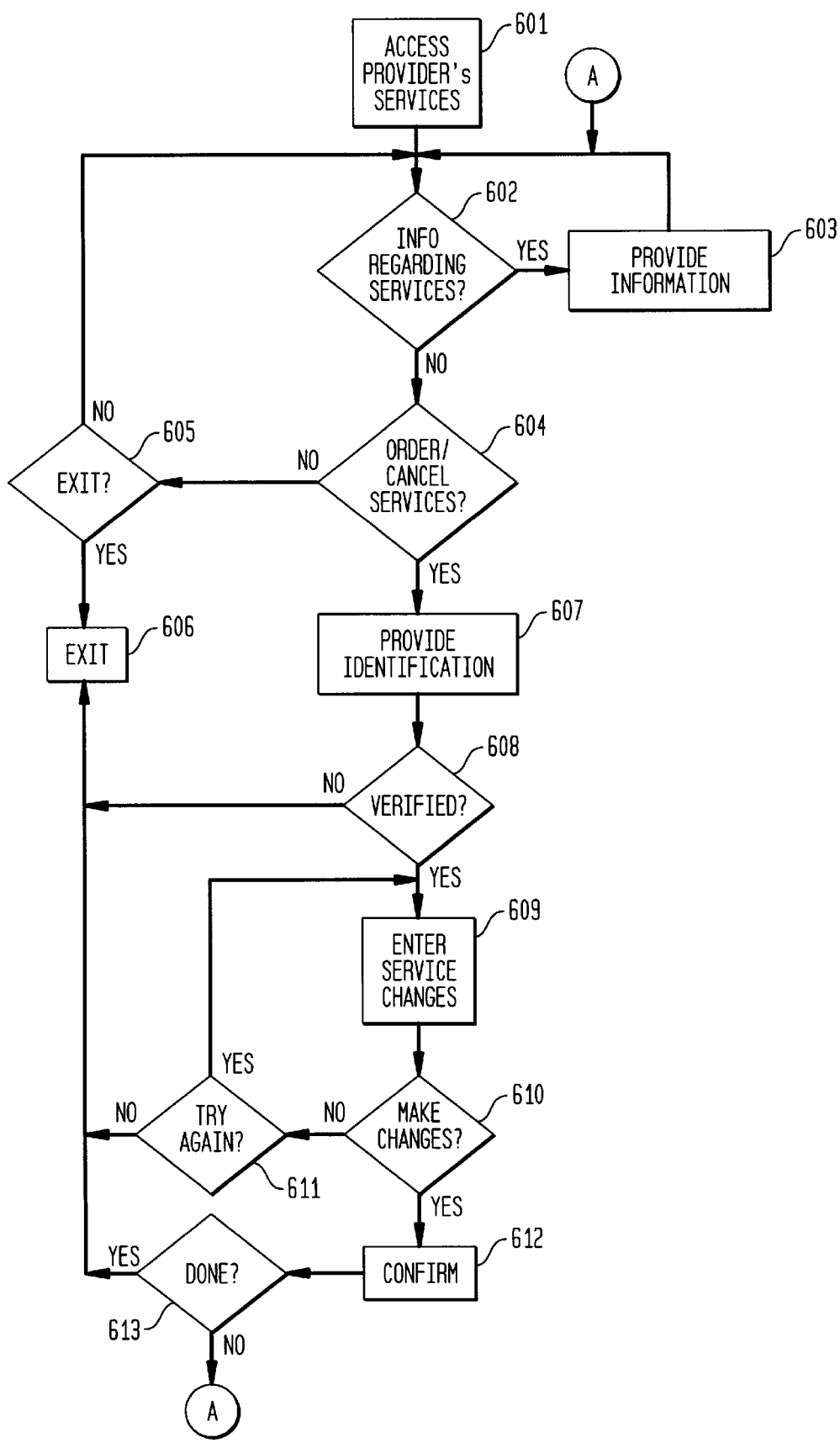

SYSTEM AND METHOD FOR ACCESSING CUSTOMER CONTACT SERVICES OVER A NETWORK

CROSS REFERENCE TO RELATED APPLICATION

This application is related to U.S. Pat. No. 5,751,961, entitled "Integrated Internet System for Translating Logical Addresses of Internet Documents to Physical Addresses," issued May 12, 1998 to Darek A. Smyk, now U.S. Pat. No. 5,751,951, the contents of which are incorporated by reference.

BACKGROUND OF THE INVENTION

The present invention relates generally to telecommunication networks and more particularly to the Internet and Internet services.

Currently, many companies provide call center automation systems and services, such as automatic call distributors, interactive voice response (IVR) systems, coordinated voice and data delivery, and voice mail. Growth in the use of such systems and services is expected to continue. While these technologies provide successful solutions to certain customer demands, they do have some limitations. For instance, callers interacting with an IVR self-service system can only be given a limited set of options at any point because of the tendency of people to become frustrated by long lists of options. Also, effectively communicating large amounts of data over the telephone can be difficult. For example, providing a customer with a line-by-line billing record over the telephone is typically not feasible. Additionally, communicating certain types of common data, such as names and addresses, or other alphanumeric data, requires specialized hardware to perform speech recognition and speech synthesis.

The recent explosion in the use of the Internet provides many new business opportunities and presents significant opportunities to providers of traditional network services. The number of Internet users is growing exponentially, stimulating network service providers to create new services to capture this new market. It is estimated that by 1999, 14 million households will subscribe to Internet access services. This number, however, reflects only a portion of the total number of Internet users because many people have access to the Internet through their school or place of employment. In fact, the current number of Internet users is estimated to be 30 million. The debut of the Microsoft Network service with full Internet access and the addition of Internet access to online services such as Prodigy, CompuServe, and America Online can be expected to bring even more potential customers online. It is projected that use of the Internet will continue to rise and therefore it is desired to provide customer services and access to information to Internet users.

One successful and widely publicized portion of the Internet is the World Wide Web (WWW or the Web). At a conceptual level, the WWW can be thought of as a vast, hyperlinked bank of data. To gain access to the WWW, a user must install on his/her computer WWW browser software and transmission control protocol/Internet protocol (TCP/IP) software and obtain a network connection from an Internet access provider. Once connected to the WWW, a user utilizes the browser to display "home pages"—graphical representations of information stored on WWW servers connected to the Internet.

WWW home pages include "hot links," which are usually represented by the browser as underlined text or as special graphical elements. When a user viewing a home page clicks on one of the hot links, the browser retrieves from the WWW network a home page associated with the selected link. Linked pages may be retrieved from the same or different servers. The sources of linked pages are transparent to the user. Thus, when navigating links between WWW pages, a user gets an impression of dealing with a single, interconnected "web" of information.

As currently implemented in the WWW, each hot link included in a Web document is assigned an address called a Uniform Resource Locator (URL). The URL includes: 1) a protocol indicator; 2) the address of the Internet server on which a particular document resides (generally this address is specified as the Internet domain name of the host or the host IP address); and 3) the address of the document on the server (this address generally consists of a full file name, including a directory path, of the file which contains the document). For example, in URL:http://www.bellcore.com/aboutbell2.html, "http," which stands for hypertext transfer protocol, identifies the protocol used between browsers and the Web servers; "www.bellcore.com" corresponds to the address of Bellcore's (the present assignee) Web server; and "aboutbell2.html" identifies the document.

Many companies have home pages that may be accessed in the above manner and that allow Internet users to get more information regarding companies. However, many corporate home pages are still in their infancy. Most provide only generic, non-customer specific information. Additionally most corporate home pages do not permit customers to make queries, get customer-specific information or to make changes to their service. Adding these capabilities would create a more personalized and dynamic exchange with existing or potential customers. Interactions could be custom tailored and product advertisements could be made user specific based on customer profiles or other data stored in corporate databases. Additionally, allowing Internet users to directly access information, products and services would allow for closing sales with customers who have become interested due to the product literature available from the home page. This potential may be lost when the home page is not integrated with the corporate systems that allow access to such products and services.

Some companies have started linking their home pages to their corporate systems. This is typically done by building point to point interfaces between the Web server and the corporate systems. This can be costly, however, particularly when compared to the potential for reuse of existing interface implementations currently in place in IVR systems. Such interfaces can also make it difficult to ensure consistency in customer interactions across a company's various channels, and make it difficult to obtain an overall view of the effectiveness of each channel.

Another current solution for linking home pages and corporate systems is electronic mail, or e-mail. However, e-mail normally requires staff to review the e-mail requests, apply business rules to determine if the requests are appropriate, input the request into the correct corporate system, and respond to the customer. These many steps restrict the advantages of automation.

Currently, Pacific Bell offers services over an agentless, telephone based Electronic Channel New Product Line (ECNPL). ECNPL call volume is projected to increase markedly. Such electronic interactions, as compared to interactions via traditional access methods, for example, over the telephone with an agent, emphasize improved operational efficiency, high availability, reliability, and security.

Additionally, using ECNPL, it is often possible to decrease the activation interval or provide immediate activation for changes in service.

However, some self-service offerings are difficult to provide through a telephone interface such as ECNPL. Such offerings may become more feasible using the powerful graphical interface of the WWW. For instance, many advanced intelligent network (AIN) services, such as Do-Not-Disturb and Follow-Me services are cumbersome to instantiate and administer through a telephone channel.

It is therefore an object of the present invention to provide a customer contact services node Internet gateway (CCSN/IG) that substantially obviates one or more of the problems due to limitations and disadvantages of the related art.

It is desirable to provide a CCSN/IG by which a user can access a provider's information and services via the Internet.

It is additionally desirable to enhance a provider's existing Internet and home page capabilities to include more complex transactions.

It is also desirable to provide a common toolset for implementing business rules and data access which will leverage the equipment and experienced staff already involved in service creation via an ECNPL.

It is further desirable to provide a common toolset for tracking and reporting on various aspects of a company's customer care offerings including integrating data across the different channels.

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof, as well as the appended drawings.

DESCRIPTION OF THE INVENTION

According to the present invention, a provider's services and customer-specific information are easily and effectively marketed, provided, and administered off of the provider's home page. Wireless and broadband services may be provided as well.

The WWW-based "customer care" channel of the present invention is an effective complement to a telephony channel and the present invention envisions a set of WWW customer contact services similar to today's AIN customer contact services. In addition to providing a complement to a telephone-based self-service channel, such as ECNPL, according to the present invention, a customer contact service node Internet gateway (CCSN/IG) expands the capabilities available through a company's home page by allowing Internet users to not only get customer-specific information and information about available services, but to access and update customer-specific data. In that way, users, for example, access a company's home page and get user-specific information, order services, update or change existing services, or disconnect from services. At the same time, the company can get information about its customers and the services and information desired by its customers. In this way, the company could respond to its customers needs and offer new and different services and information as appropriate.

As an example, in the telephony industry, the CCSN/IG of the present invention allows users to access self-service offerings such as 900/976 call blocking, custom calling, custom local area signalling services (CLASS), inside wire repair plan, and residential optional calling plans. Additionally, the CCSN/IG allows for easy administration of personal identification number (PIN) changes and for the administration of complex services, such as Do Not Disturb and Follow Me. Users will also be able to access customer-specific information, such as billing data and services data. The CCSN/IG allows providers to get information about its customers by providing questionnaires and profiles and could receive customer complaints and/or comments in general.

The CCSN/IG of the present invention complements other telephone based ECNPL self-service offerings by providing similar services to other market segments while reusing the embedded base of systems and interfaces that are currently used in telephony-based self-service offerings. It is envisioned that companies will be able to leverage their existing operational systems that are utilized to provide ECNPL in providing a CCSN/IG. Thus, the overall cost and time of providing products and services to Internet users is small.

From a marketing perspective, providing access to services and information via the Internet makes the company's products and services more readily available and therefore will help promote those products and services, educate users and increase sales. Additionally, processing customer requests via a self-service channel costs significantly less as compared to processing such requests via an agent. Furthermore, compared to the relatively high costs associated with interactive voice recognition (IVR) ports, voice recognition boards, and the other components of a self-service channel with a telephone-based user interface, a self-service channel with an Internet-based user interface that is front-ended by the Internet can drive the cost per transaction significantly lower. Additionally, sizing telephony hardware resources to meet required service level objectives during peak demand periods makes cost of the telephone system higher. For example, at the beginning and the end of college semesters, the demand for telephone services may be great. Offering a software-based solution, such as Internet access, provides a cost-effective solution. This is particularly so in the example above because many of those requesting service connection or disconnection would have access to the Internet.

Additionally, new services and products can be offered to users without delay because the provider's home page can be easily changed to allow access to and selection of such new products and services.

Thus, the CCSN/IG of the present invention provides a gateway between a provider's WWW home page and its information and services and also provides a single platform for all customer care access methods. The present invention also advantageously provides the opportunity to immediately offer self-service options on the WWW that parallel those offered through an ECNPL.

Additionally, the CCSN/IG of the present invention advantageously provides an integrated platform for development, operations, administration and reporting as well as the ability to leverage previous investments in systems, interfaces, networks and staff. Specifically, the CCSN/IG of the present invention allows a provider to leverage its existing operations support systems (OSS) rather than incurring these costs again. As new OSS interfaces are incorporated into the CCSN architecture, the cost of developing these interfaces is incurred once, rather than being repeated for each customer care channel.

An additional benefit of the present invention is that the CCSN/IG of the present invention can be used with existing applications, such as Bellcore's proprietary SPACED application and the data and reporting system (DRS) to provide an integrated view of the interactions taking place over the Internet and across the traditional telephone interface.

To achieve these and other advantages and in accordance with the purposes of the invention, as embodied and broadly described, the invention includes a customer contact services system comprising means for accessing the Internet, means for entering a request, means for displaying the request, customer contact services node Internet gateway (CCSN/IG) means, coupled to the display means and to the Internet, for accepting the request, network means, coupled to the CCSN/IG means, for providing access to a particular set of services and data, and customer contact services node (CCSN) means, coupled to the network means, for processing the request and for providing information about the request through the network means and the CCSN/IG means to the display means.

In accordance with the purposes of the invention, as embodied and broadly described, the invention also includes a method for user access to data and services of a provider comprising the steps of accessing a network, entering a request, displaying the request, accepting the request via a customer contact services node network gateway, providing access to a particular set of data and services of the provider, and processing the request and providing information about the request through the network and the customer contact services node network gateway.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the Drawings:

FIGS. 4A–4E are exemplary screens illustrating how a user interfaces with a customer contact services system in accordance with one embodiment of the present invention;

FIG. 6 is a flow diagram illustrating exemplary steps taken during an interface with a customer contact services system in accordance with one embodiment of the present invention.

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers where appropriate.

The following description of the preferred implementations of the present invention is only exemplary of the invention. The present invention is not limited to these implementations, but may be realized by other implementations.

Figure 1:
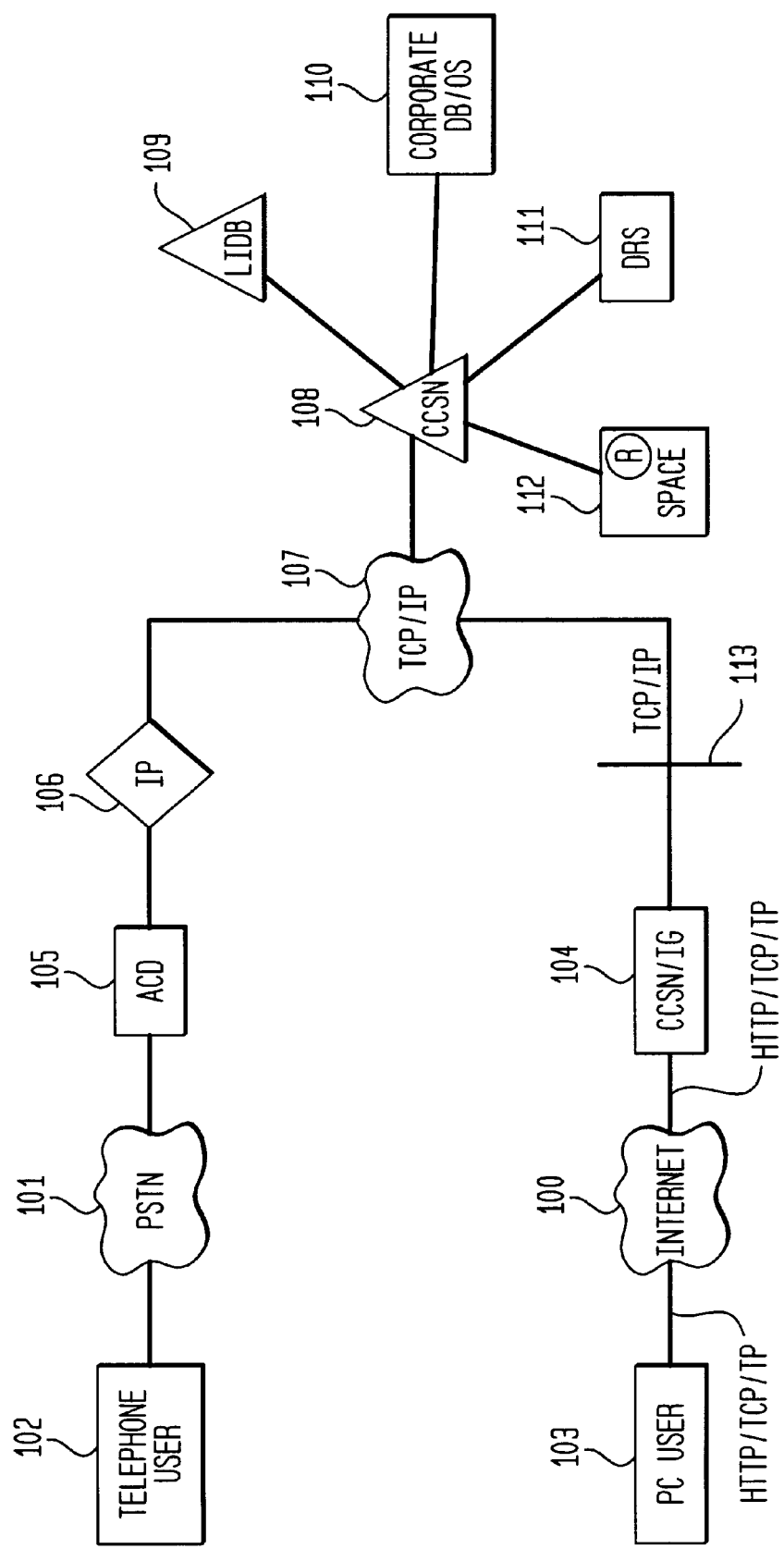
FIG. 1 is a block diagram of a customer contact services system in accordance with one embodiment of the present invention.

FIG. 1 is a block diagram of an integrated Internet system in accordance with one embodiment of the present invention. As shown, a PC user 103 is connected to the Internet 100 via the HTTP/TCP/IP protocol. Although a PC user 103 is shown in FIG. 1, the present invention is not so limited. Instead of using a PC, a user could access the Internet via a Unix workstation, a wireless personal digital assistant, or any other type of device used to access the Internet. The Internet 100 communicates with the CCSN/IG 104 also via the HTTP/TCP/IP protocol. The CCSN/IG 104 provides a gateway interface between the PC user 103 and a provider's customer contact services node (CCSN) 108. The CCSN/IG 104 runs standard HTTP server software that accepts an HTTP request from the PC user 103 over the Internet 100. The CCSN/IG 104 communicates with a network 107 using the TCP/IP protocol. Interposed between the CCSN/IG 104 and the network 107 is a "firewall" 113, which prevents the PC user 103 from gaining unauthorized access to files and applications in the network 107.

The network 107 is also connected to the CCSN 108 via the TCP/IP protocol, or any other appropriate protocol. The CCSN 108 runs applications, such as Bellcore's proprietary SPACE® application 112. The SPACE® application 112 is used to create business rules for interacting with customers and has been successfully implemented in telephone service control points (SCP) to efficiently create and instantiate telephone services. The SPACE® application 112 generates call processing records (CPR) and stores them in a database, not shown, associated with the CCSN 108.

The CCSN 108 is also connected to the line information database (LIDB) 109. The LIDB 109 contains information regarding telephone service subscribers. It may be keyed by the billing telephone number of the user 103 and retrieves information about particular accounts. More specifically, the LIDB 109 contains information essential for making collect calls, calls billed to third numbers, and calls charged to calling cards. The LIDB 109 is used to automatically verify that the telephone number to which a person wants to bill a collect or third-number call has been assigned and can be charged for such calls. The LIDB 109 also validates the personal identification number (PIN) assigned to each calling card.

The CCSN 108 is also connected to the corporate database and operations system 110, which is used to support the operations and applications of the CCSN 108, such as interactions with customers and customer billing. The CCSN 108 is also connected to the data and reporting system (DRS) 111. The DRS 111 may be used to collect information on customer interactions taking place via the CCSN 108. Thus, information gathered about a PC user 103 who accesses the CCSN 108 can be collected by the DRS 111. Additionally, information provided by such users, such as in response to questionnaires, can be stored and maintained in the DRS 111.

The integrated Internet system as shown in FIG. 1 also allows a telephone user 102 to access the network 107 and the CCSN 108. Access to the CCSN 108 for a telephone user 102 is accomplished via public switched telephone network (PSTN) 101, automated call distributor (ACD) 105 and intelligent peripheral (IP) 106. These elements comprise an IVR system by which a user can access information and services, made available through the CCSN 108, in a self-service or agentless fashion. Alternatively, a telephone user 102 can access the provider's services and products with the assistance of an agent, if necessary.

As illustrated in FIG. 1, the CCSN/IG 104 can be thought of as an add-on to existing systems that allow access to a CCSN 108 by a telephone user 102. In this manner, one customer contact system may be implemented for both access methodologies using the same set of rules and logic as well as using the systems previously in place for the telephone system.

Figure 2:
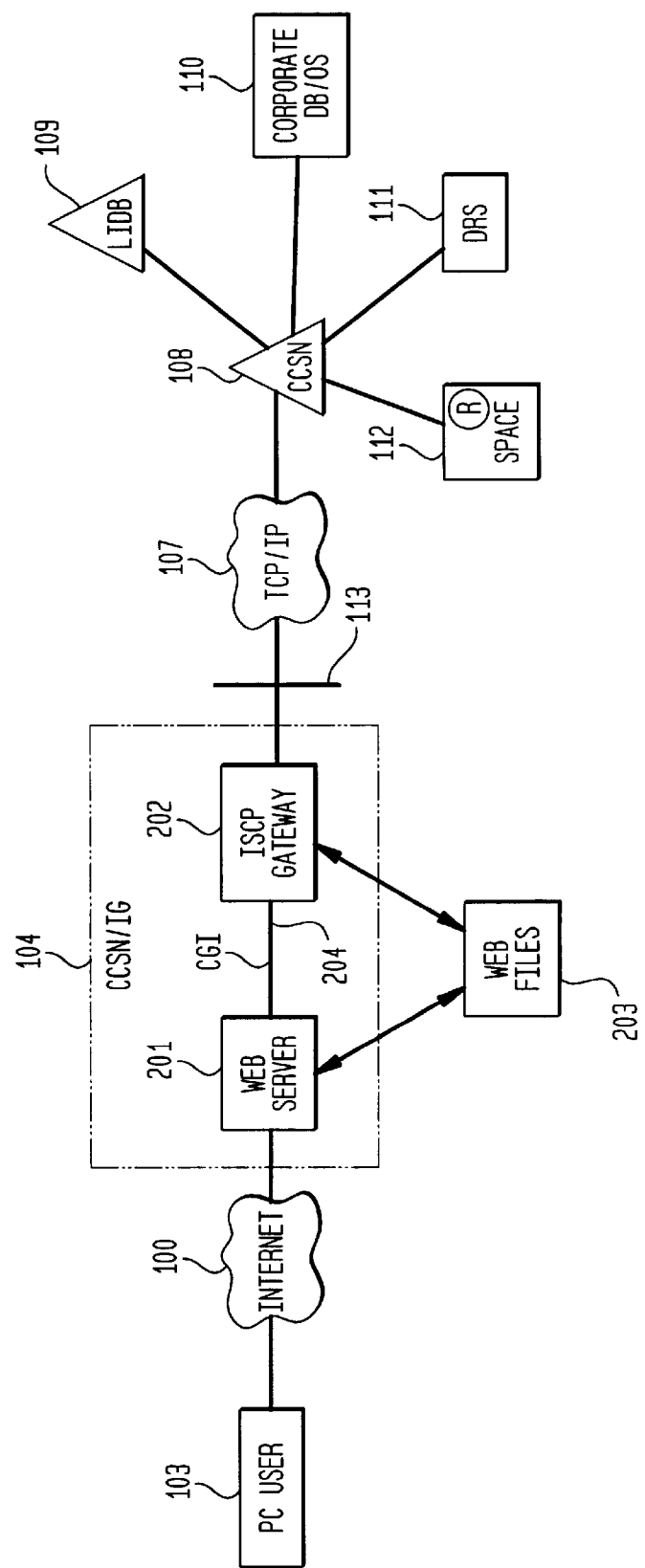
FIG. 2 is a block diagram showing in greater detail the customer contact services system in accordance with one embodiment of the present invention.

FIG. 2 is a block diagram showing in greater detail the CCSN/IG system in accordance with one embodiment of the present invention.

As shown in FIG. 2, the CCSN/IG 104 comprises a Web server 201 and an integrated service control point (ISCP) gateway 202. The Web server 201 corresponds to a conventional Internet server, such as Webstar from Quarterdeck Corp. or Netscape Communications Server from Netscape Communications Corp. The Web server 201 communicates with the Internet 100 via the HTTP/TCP/IP protocol. To communicate on the Web, the PC user 103 must be running a Web browser application, such as Netscape's Navigator or Microsoft's Internet Explorer, which supports hyperlinks based retrieval of documents stored in Web files 203 any place on the Internet 100. The Web files 203 may include documents in hypertext markup language (HTML), that may contain graphics, video, and sound, and which may be linked to other documents.

The ISCP gateway 202 implements the application function of the gateway. In general, the ISCP gateway 202 responds to user queries forwarded by the Web server 201 by returning HTML templates augmented with the data retrieved from back-end systems, such as the ISCP and the systems that the ISCP interfaces with. The ISCP gateway 202 interacts with the Web server 201 utilizing the interface of the Web server 201. This interface may be, for example, the common gateway interface (CGI) 204, shown in FIG. 2. The CGI 204 is used to communicate between the Web server 201 and the applications that can service the PC user's 103 request. Instead of the CGI 204, the server interface can be NSAPI when the Netscape Web server is used or ISAPI when the Microsoft Web server is used.

Figure 3:
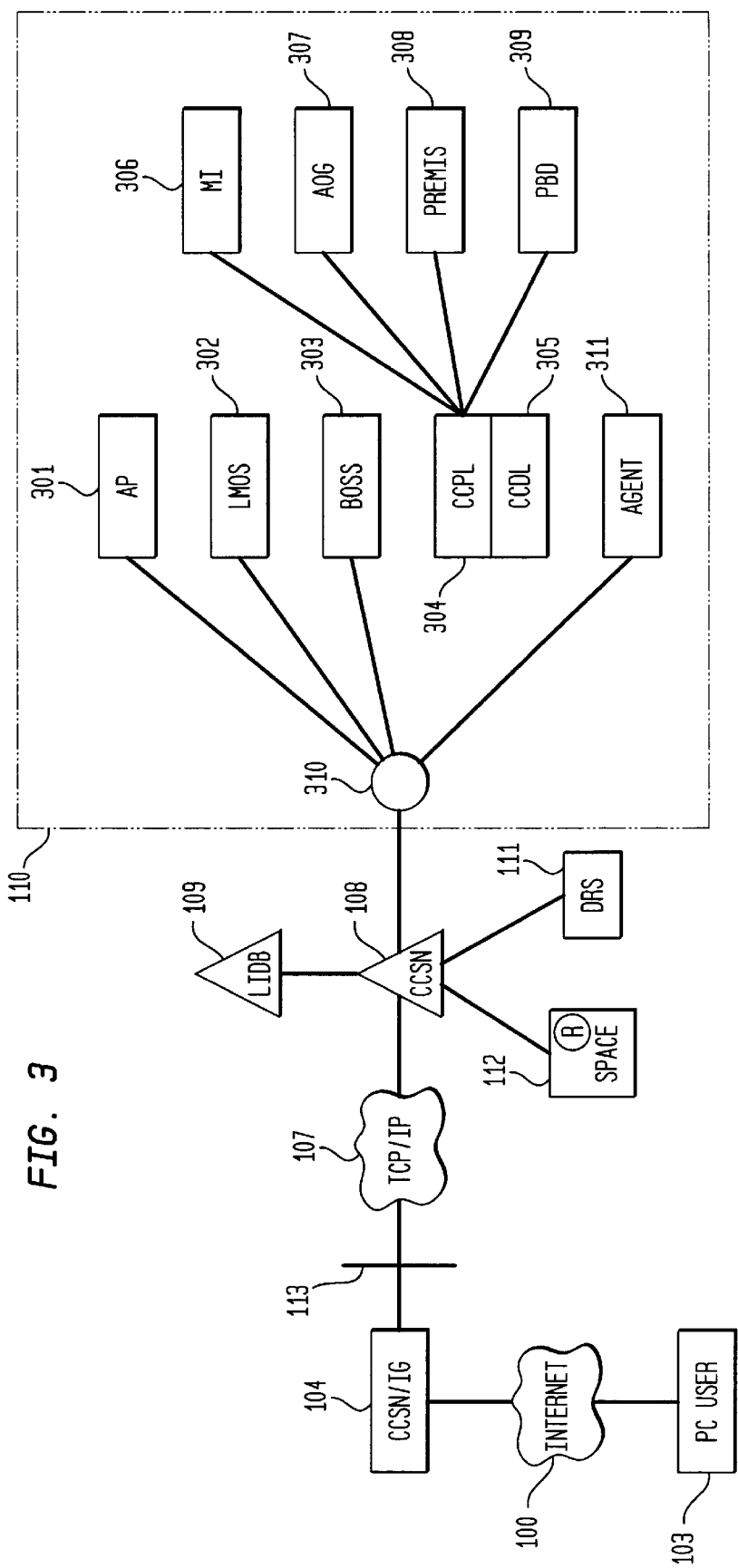
FIG. 3 is a block diagram showing in greater detail the corporate database and operations system shown in FIG. 2 in accordance with one embodiment of the present invention.

FIG. 3 is a block diagram showing in greater detail the elements of an exemplary corporate database and operations system 110 in accordance with one embodiment of the present invention. It should be noted that the elements of corporate database and operations system 110 will differ depending on the corporate system which the user 103 accesses. The elements of the corporate database and operations system 110 shown in FIG. 3 are exemplary of a telecommunications provider.

The CCSN 108 is connected to the elements of the corporate database and operations system 110 via a wide area network 310. The wide area network 310 is directly connected to various database and operations systems as described in greater detail below.

The AP 301, connected to the wide area network 310, is an operations system used to activate and or modify services for a user 103. Thus, when user 103 wants to modify his services, the service request is sent to the AP 301 operations system. The LMOS 302 is an operations system used to provide service assurance. Such service assurance can include, for example, trouble reporting, testing, and fault isolation. The BOSS 303 is an operations system used to maintain customer billing and payment information.

The CCPL 304 is a gateway system used to provide access to the various operations systems 306–309. The CCPL 304 also performs protocol conversions and maintains any local databases. The CCDL 305 is such a database within the CCPL 304 and is used to store temporary miscellaneous corporate data such as temporary pricing plans for current promotional campaigns.

The PBP 309 is an operations system that provides customer verification and authentication services. An exemplary service could be personal identification number (PIN) validation. The PREMIS system 308 is an operations system used to maintain and validate the location of customers. For instance, PREMIS 308 can be used to maintain the street addresses of customers. The AOG 307 is an operations system used to maintain information regarding pending customer service activation requests. Finally, the MI 306 is an operations system used to maintain for each customer a profile of the services used by that customer.

The corporate database and operations system 110 also may include an agent station 311. Instead of accessing any of the operations systems 301–303 or 306–309, the user 103 can, in alternative embodiments, interface with the agent station 311. The agent at the agent station 311 will work at an appropriate desktop device such as a PC, a workstation, a 3270 terminal, or any other appropriate device.

According to the present invention, an Internet interface through a CCSN/IG to a provider's home page could be used to allow customers to order or discontinue services or to get customer-specific information. For instance, in a telecommunications application, the CCSN/IG of the present invention could allow customers to order certain telephone services or disconnect from services over the Internet. By permitting service connection/disconnection in this manner, it is envisioned that backlogs or the need to use a greater than normal number of service operators during peak service connect/disconnect periods, such as the beginning and end of school years, would be eliminated. FIGS. 4A–4E are exemplary screens illustrating how a user interfaces with the customer contact services system in accordance with one embodiment of the present invention.

FIG. 4A shows an example of a provider's home page according to the present invention. A PC user 103, shown in FIGS. 1–3, could access this screen, or one like it, through the Internet 100 and the CCSN/IG 104 of the present invention. As shown in FIG. 4A, the user could first get information about the service features of the provider. For instance, where the provider is a telecommunications company, the user could access information about call forwarding 401, call screening 402, call waiting 403, select call forwarding 404, and speed calling wait 405. By selecting one of the options 401–405, the user can access information such as general information about the service, and the cost of the service. Selecting one of the options 401–405 will bring up another screen, not shown, which will display specific information about the requested service.

As also shown in FIG. 4A, the user can select to order or cancel any of the available service features 401–405 by selecting the order/cancel option 406. Selection of the order/cancel option 406, will cause the screen shown in FIG. 4B to be displayed. FIG. 4B is a verification screen and requires the user to enter certain information before any requested changes to a service can be made. First, in the case of a telecommunications provider, the user is prompted to enter his telephone number in box 407. After entering the telephone number, the user must enter a password which can be, for example, a certain number of digits of a calling card number 408, an account number 409, or a PIN number 410. After the telephone number and password have been entered, the user selects the submit key 411 and proceeds on to the service modification screen shown in FIG. 4C.

The service modification request screen in FIG. 4C can first display the account number and name of the person seeking to modify their service in box 412. FIG. 4C also shows table 413 showing service features that are available to the user. The service features can be different for different users, depending on the geographic availability of services for particular users. Table 413 indicates whether a particular service feature is currently subscribed to. For service features that are currently subscribed to, such as call waiting and speed calling eight, shown in table 413, the user can select to cancel such services, while for service features that are not currently subscribed to, the user can elect to order such services. Additionally, for all service features listed in the table 413, the user can elect no change to each current service feature. When the user is finished making his desired service modifications, he will depress the submit box 414. In addition, if the user wants to abort any of the service changes, he can select the cancel box 415. Instructional text may be inserted at the ellipses 420.

Figure 4D:
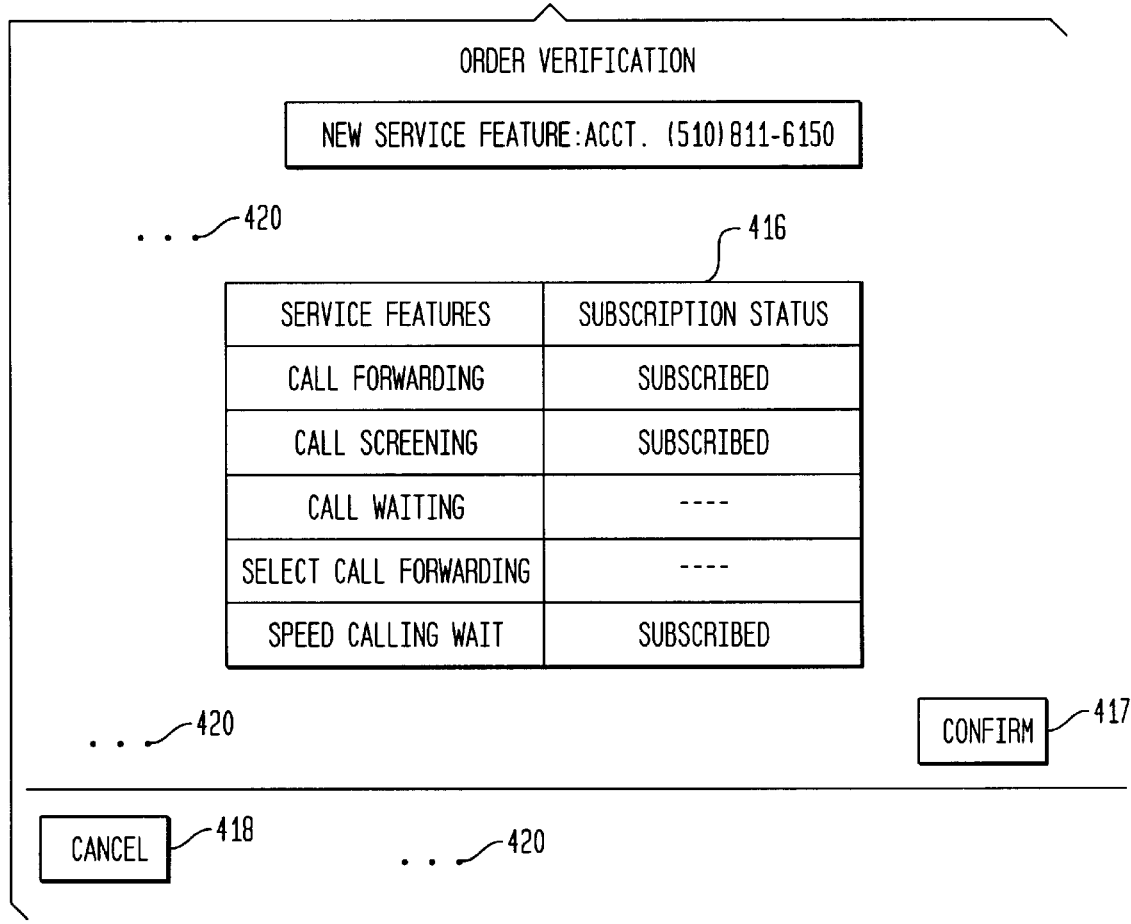

If the user selects to change his service, the order verification screen of FIG. 4D preferably appears. The order verification screen displays a subscription status table 416 which lists the subscription status of all of the available service features after any changes have been made. The order verification screen can also optionally display the service charges that will be billed to the user as well as any other appropriate messages about the user's account or services. Such information, or other instructions may appear at ellipses 420. After the user reviews the subscription status table 416 and any other information provided, the user will accept the service changes by selecting the confirm box 417. If, however, after reviewing the subscription status table 416 and the other information provided to the user, the user decides that the service modifications are not acceptable, the user can abort the changes to service by selecting the cancel box 418.

Figure 4E:
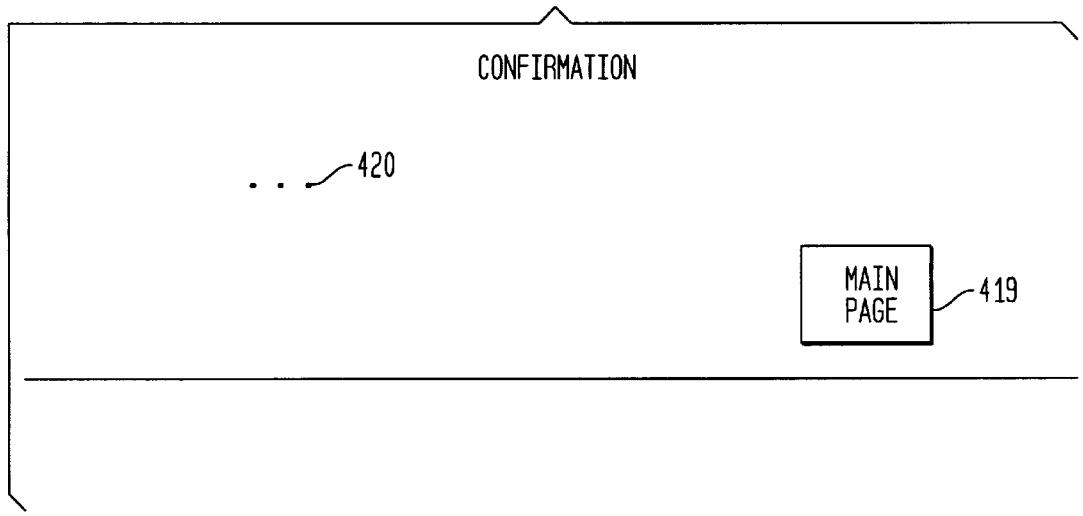

If the user selects the confirm box 417, a confirmation screen, such as that shown in FIG. 4E, may appear. The confirmation screen will, for example, inform the user that the service modifications have been accepted for processing and when the service changes will be made at ellipses 420. Additionally, the confirmation screen may advise the user that he will receive a separate confirmation by mail. The confirmation screen could also be configured to inform the user hat a separate confirmation of the service modifications will be sent by e-mail. Also at the confirmation screen, the user can return to the provider's main page by selecting the main page box 419.

As described above, FIGS. 4A–4E are exemplary screens that can be displayed when a user accesses a provider's services through the CCSN/IG of the present invention. The screens provided to the user will differ depending on the services made available by the provider. Additionally, the screens a specific provider makes available can differ depending on the particular users. For example, different screens can be made available to an individual account holder as opposed to a small business account.

Figure 5:
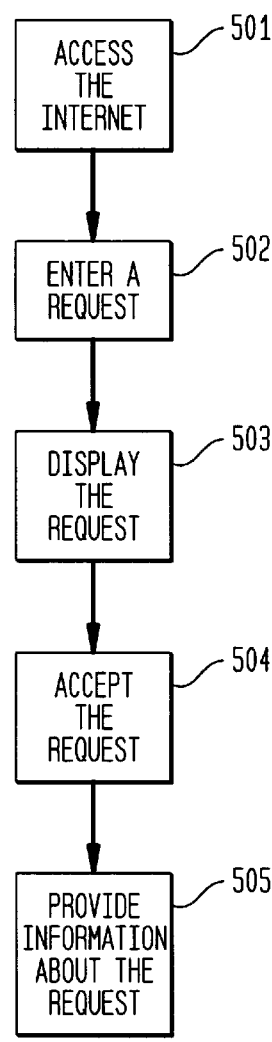
FIG. 5 is a flow diagram showing how a service request is made using the customer contact services system in accordance with one embodiment of the present invention.

FIG. 5 is a flow diagram showing how a request is made using the customer contact services system in accordance with one embodiment of the present invention. As shown in FIG. 5, a user first accesses the Internet in step 501. Included within step 501 is the step of accessing information about a particular service provider. This may be accomplished by accessing the home page of a service provider. Following access to information about the service provider, the user enters a request in step 502. As explained above, such a request could for example be a request to add an additional telephone service, or change a telephone service, or to receive customer-specific information. The present invention, however, is not so limited and also could include a request regarding ordering merchandise from a retailer, for example. After the request is entered in step 502, it is displayed to the user in step 503. The request is displayed so that the user can modify the request before it is sent to the provider. The request is then accepted by the provider in step 504. After the request is accepted, the provider provides information about the request to the user in step 505. The information provided to the user can be that a change in service, such as an addition or cancellation of service, has or will be processed by the provider, for example. Alternatively, the information could be the customer-specific information, such as billing data, requested by the user. In order for the provider to send such information to the user, it may be necessary for the provider to access its own databases and/or operations systems, as shown in FIGS. 1–3.

FIG. 6 is a flow diagram illustrating exemplary steps taken during an interface with a customer contact services system in accordance with one embodiment of the present invention. In step 601, the user accesses the provider's services, and a home page screen, such as that shown in FIG. 4A, may appear. Next, in step 602, the user decides whether he wants to get any information about the provider's services. If yes, the information is provided in step 603. If the user does not want any additional information, then he proceeds to step 604 where he decides whether he wants to order or cancel any of the provider's services. If the user does not want to order or cancel any services, in step 605, the user decides if he wishes to exit from the provider's services, if not, the user is returned to step 602 and if so, the user is exited at step 606.

When the user wants to order or cancel services, at step 607 information identification, such as a user identification and a password, is inputted. At step 608, the user is verified if the correct identification information was entered. If not, the user is exited at step 606. If the user is verified, then at step 609 the user enters the desired service changes. The user confirms whether the entered service changes are correct at step 610. If the changes are not correct, the user can try again at step 611 and correct the changes at step 609. If the changes are correct, the changes are entered. Confirmation of the service changes is made at step 612. If the user is done accessing the provider's services, at step 613 he so indicates and is exited at step 606. If the user is not finished, he is returned to step 602.

It should be noted that the steps shown in FIG. 6 are exemplary only and can differ depending on the type of services provided by the provider and can also differ depending on the type of user.

Although previously discussed in terms of use over the Internet, the CCSN/IG of the present invention can also be used in an "intra-net" or internal Web server used exclu sively to service the needs of an individual organization. Estimates indicate that more internal Web servers exist today than external Web servers. These internal Web servers provide a number of advantages when deploying applications for internal use. For instance, browsers already exist for a wide variety of end-user platforms, making the task of cross-platform development and support much easier. Additionally, in an intra-net situation, only the browser is distributed to each desktop while the application resides at a central location thereby making the administration of internal applications much easier. The same browser can be used for many different applications and therefore users do not have to become accustomed to the look and feel of multiple browsers. Also, the powerful presentation capabilities of today's Web browsers allow for creation of appealing and easy to use applications.

There are several additional advantages of such an intra-net system. First, the system administrator of an intra-net system has a great deal of control over who has access to the system and to the particular applications residing in the system. Additionally, there is no need to provide a firewall and the security risks of such a system are much lower than in an Internet system. These lower security risks make the engineering of such a system much easier than in an Internet system.

While there has been illustrated and described what are considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

We claim:

1. A customer contact services system comprising:
   means for accessing the Internet;
   means for entering a customer request;
   means for displaying the request;
   a customer contact services node Internet gateway (CCSN/IG), coupled to the display means and the Internet, for accepting the request;
   a network, coupled to the CCSN/IG, for providing access to a particular set of services and data retained by a service provider; and
   a customer contact services node (CCSN), coupled to the network and located remotely from the accessing means for processing the request to facilitate customer access to and manipulation of a plurality of customer-specific information and services retained by the service provider.

2. The system according to claim 1, wherein the entering means responds to the information provided by the CCSN regarding the request.

3. The system according to claim 1, wherein the CCSN comprises means for invoking at least one call processing record (CPR) in response to the request.

4. The system according to claim 1, further comprising interactive voice response (IVR) means, coupled to the network means, for providing telephone access to the network means and for permitting a request to be made over the telephone to the CCSN.

5. The system according to claim 1, wherein the CCSN/IG means further comprises:
   a Web server for servicing customer requests from the World Wide Web (WWW); and
   an integrated services control point (ISCP) gateway, coupled to the Web server, for accessing the network means.

6. The system according to claim 5, further comprising a firewall disposed between the ISCP gateway and the network.

7. A method for customer access to and manipulation of services and data of a service provider comprising the steps of:
   accessing a network;
   entering a request;
   displaying the request;
   accepting the request via a customer contact services node Internet gateway (CCSN/IG); and
   processing the request remotely to facilitate customer access to and manipulation of a plurality of customer-specific information and services retained by the service provider.

8. The method according to claim 7, wherein the accessing step comprises accessing the Internet.

9. The method according to claim 7, wherein the accessing step comprises accessing an intra-net.

10. A customer contact services system, comprising:
    a customer end terminal connected to the Internet;
    a service provider Web server connected to the Internet;
    means for establishing a connection between the customer end terminal and service provider's Web server over the Internet; and
    means for remotely facilitating customer access to and manipulation of customer-specific information and services available through and retained by the service provider's Web server.

11. The system of claim 10 wherein the customer end terminal is a computer.

12. The system of claim 10 wherein the establishing means includes a customer contact services node Internet gateway.

13. The system of claim 10 wherein the facilitating means includes a customer contact services node.

14. A method for customer access to customer-specific services and data retained by a telecommunications service provider, comprising the steps of:
    establishing a connection between a customer end terminal and a remote telecommunications service provider's Web server over the Internet;
    providing customer access to the customer-specific information and telecommunications services available through the telecommunications service provider's Web server;
    allowing customer modification of at least one of customer-specific information and telecommunications services available through the telecommunications service provider Web server; and
    receiving verification from the telecommunications service provider Web server of any modifications made to the customer-specific information and telecommunications services.

* * * * *